(No Model.) 2 Sheets—Sheet 1.
R. P. SELLON & W. M. MORDEY.
REGULATOR FOR ELECTRIC GENERATORS.
No. 373,859. Patented Nov. 29, 1887.
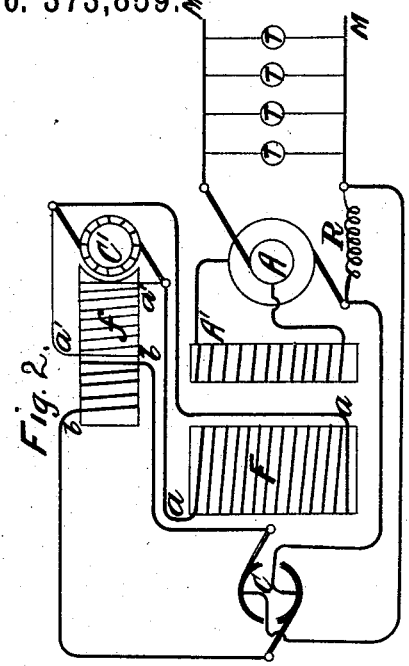
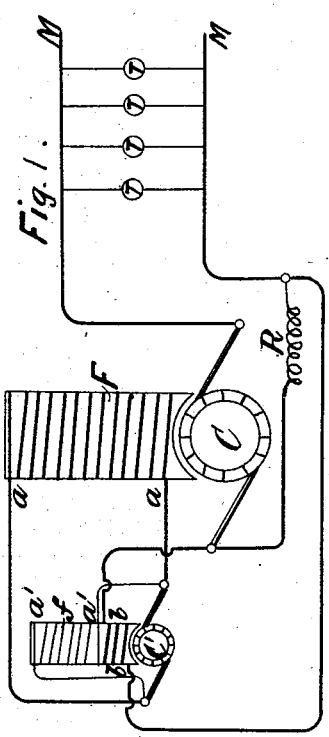
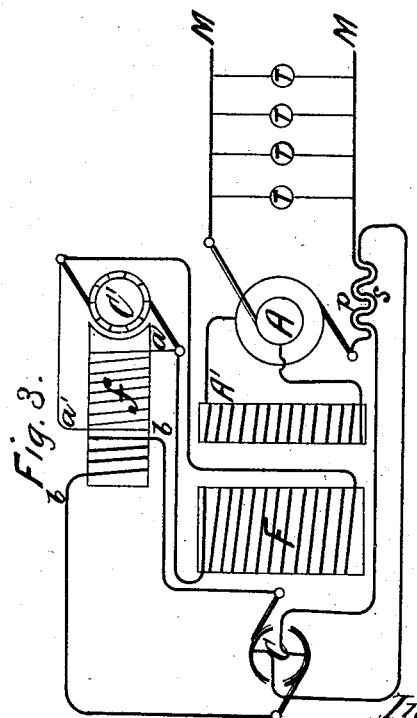

(No Model.) 2 Sheets—Sheet 2.
R. P. SELLON & W. M. MORDEY.
REGULATOR FOR ELECTRIC GENERATORS.
No. 373,859. Patented Nov. 29, 1887.
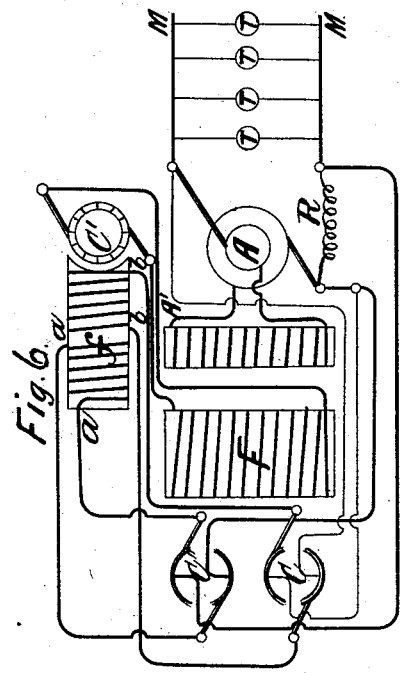
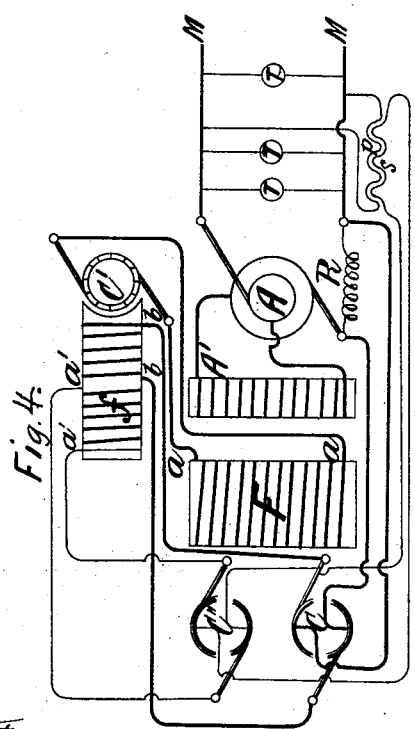
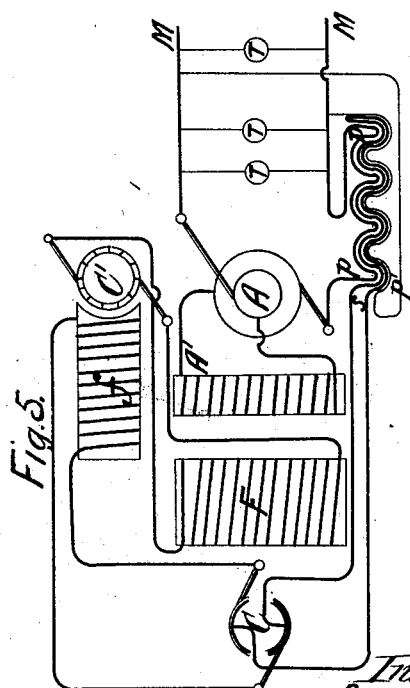

UNITED STATES PATENT OFFICE.

ROBERT PERCY SELLON AND WILLIAM M. MORDEY, OF VICTORIA WORKS, BELVEDERE ROAD, COUNTY OF SURREY, ASSIGNORS OF ONE-THIRD TO CHARLES E. WEBBER, OF VICTORIA WORKS, ENGLAND.

REGULATOR FOR ELECTRIC GENERATORS.

SPECIFICATION forming part of Letters Patent No. 373,859, dated November 29, 1887.

Application filed June 8, 1887. Serial No. 240,655. (No model.) Patented in England December 18, 1886, No. 16,662.

*To all whom it may concern:*

Be it known that we, ROBERT PERCY SEL-LON, electrical engineer, and WILLIAM MOR-RIS MORDEY, electrician, subjects of the Queen of Great Britain and Ireland, and residing at Victoria Works, Belvedere Road, in the county of Surrey, England, have jointly invented certain new and useful Improvements in Means for Automatically Regulating Electric Generators, (for which we and Charles E. Webber have applied for a patent in Great Britain on the 18th of December, 1886, No. 16,662,) of which the following is a specification.

This invention has reference, mainly, to alternate-current electric generators, and is for improved means of obtaining self-regulation of the current or electro-motive force. It is in part applicable to continuous-current generators.

Figures 1 to 6 of the accompanying drawings illustrate diagrammatically various ways in which we may carry out our invention, as hereinafter described and explained.

In all the figures similar parts are as far as possible indicated by similar letters of reference.

In Fig. 1, C is the commutator or collector, and F the field magnet or magnets of a continuous-current dynamo supplying the mains M M, in one of which we usually place a resistance, R. The fields F are excited by a current generated by a separate dynamo, of which C' is the commutator or collector, and $f$ the field magnet or magnets. This separate exciter may be either a shunt, compound, or series-wound machine. In Fig. 1 it is shown as a shunt machine so far as its own current is concerned, $a'$ $a'$ being the shunt-circuit. Its brushes are connected directly to the terminals $a$ $a$ of the exciting-coil on F.

In addition to the shunt-coil $a'$ $a'$, the field $f$ is provided with a coil or winding, $b$ $b$, which is connected directly to the terminals of the resistance R or across a portion of one of the main conductors M M, corresponding to R. Thus the coil $b'$ $b'$ forms a portion of the main circuit supplied by the machine of which C is the commutator, and thus by an exceedingly small expenditure of energy the field $f$ of the separate exciter is controlled by the current flowing through the mains M M, and in turn the larger field, F, and the current or electromotive force is regulated by augmentation or diminution of the exciting-current in the coil $a$ $a$. In the constant electro-motive-force systems the current in the coil or winding $b$ $b$ is made to assist or strengthen the magnetization of $f$. In the case of working with constant current the coil $b$ $b$ opposes or weakens the effect produced by the coil $a'$ $a'$.

When the current which is or may be required to be provided by the main dynamo-machine is not very large, we dispense with the resistance R and place the coil $b$ $b$ directly in the external circuit of the main dynamo-machine. For the following reasons, however, we prefer in most instances to retain the resistance R: first, because by this our improved method of regulation we require only a very small magnetizing effect on the field-magnets $f$ in order to obtain even a considerable regulating effect on the large field magnet or magnets F, and this effect on $f$ is not conveniently obtained by the use of the whole of the current supplied by the main dynamo; second, by the use of the resistance R (which may be so small that the loss in it may be ignored) we are enabled readily to secure the amount of regulation or correction which the circumstances of the case may require, either as regards electro-motive force, current, or speed.

In applying this improvement to separate exciters, which are series or compound wound, the main current or the portion of the main current shunted from R may pass through a separate coil or winding on $f$, as at $b$ $b$, Fig. 1, or may be connected to a part or the whole of the ordinary winding, as may be readily understood.

This improved method of obtaining self-regulation of a separately-excited dynamo is applied by us to alternate-current machines by using a somewhat similar arrangement to that described with reference to Fig. 1, but with the addition of a commutator, as shown in Fig. 2, where F is the field magnet or magnets, A' the armature, and A the collector, of an alternate-current machine, of which M M are the main external conductors, in one of which a resistance, R, is placed. The field-magnet F, which is wound with a coil or coils, $a\ a$, is magnetized by a separate exciter, of which $f$ is the field magnet or magnets having a shunt (or it may be a series or compound) winding, $a'\ a'$, and a regulating-coil, $b\ b$. From the terminals of the resistance R a shunt is taken, the current so obtained being commutated or made continuous in direction by the commutator C, placed on the shaft of the main machine F A' A. Brushes rest on C, from which the commutated current is conducted to the winding $b\ b$; or, instead of obtaining the current for the correcting-coil $b\ b$ by shunting it from a portion of the mains, as in Fig. 2, we may make use of the arrangement shown in Fig. 3. A transformer, of which the primary $p$ is in the main circuit, has its secondary $s$ connected with a commutator, C, placed on the shaft of the machine, the current from $s$ being thereby commutated and passed through $b\ b$; or we may employ the improved method shown in Fig. 4, according to which the initial excitation of the alternate-current generator is obtained from the separate exciter, the initial field of which is obtained from the secondary circuit $s$ of a transformer, the primary $p$ of which transformer is a shunt on the mains or terminals.

The alternate-current machine, as before, is shown, F indicating the field-magnet, A' the armature, and A the collector.

M M are the mains, in one of which is placed a resistance, R.

The separate exciter by its commutator or collector C' and brushes is connected directly to the coil or winding $a\ a$ on the field magnet or magnets F.

A transformer is used to supply the initial excitation to $f$. The primary $p$ is connected to the mains M M, and the secondary $s$ is connected to a commutator, C'', (placed on the same shaft as A,) and thence to the coil $a'\ a'$ on the field $f$ of the separate exciter.

The correcting or regulating coil $b\ b$ is supplied by current from the main, as in Fig. 2.

In the arrangement Fig. 5 the whole excitation of F may be derived from the separate exciter, the field-magnets $f$ of which are magnetized by the commutated current from the secondary $s$ of a transformer, the primary of this transformer, $p\ p'$, being composed partly of a shunt, $p'$, on the mains or terminals and partly of a conductor, $p$, placed in the main circuit; or the field-magnets $f$ of the exciter may be magnetized, as shown in Fig. 6, directly from the alternate-current generator F A' A, the initial excitation in the coil $a\ a$ being obtained by a shunt from the mains or terminals by way of the commutator C'', and the correcting excitation in coil $b\ b$ by a shunt by way of the commutator C from a portion of the mains M M or from a resistance, R, placed in the mains in the manner hereinbefore described.

In using the current shunted from the ends of the resistance in the main the commutator is arranged as in ordinary commutation of alternate currents, and is not a collector to merely direct into the magnetizing-circuit the alternate pulsations of currents which are already of one direction.

Instead of shunting a fraction of the main current from a portion of the main conductor or from a resistance placed in the main conductor for the purpose indicated, we may commutate the whole current, but prefer, for the reasons hereinbefore given, only to take a portion of it shunted from the main conductor in the manner described.

The commutator C is shown in its simplest form as consisting of two contact-pieces only; but it will be understood that the number of contact-pieces depends on the number of alternations of current occurring during each revolution.

In applying our invention to alternating-current machines in which the current is generated in the fixed or stationary portions of the machine the arrangement of a rubbing contact at A is not required.

We claim as our invention—

1. The combination, with a dynamo-electric generator and a main circuit supplied thereby, of an exciter to the aforesaid generator having the excitation of its own field controlled or regulated by the energy of the main current, substantially as described.

2. The combination, with an alternate-current dynamo-electric generator, of an exciter to said generator having the excitation of its own field controlled or regulated by the energy of the main current, the alternating impulses obtained from the main current and utilized for excitation being commutated before they are so utilized, substantially as described.

3. The combination, with an alternate-current dynamo-electric generator, of an exciter to said generator, a transformer operated by the main current and supplying energy for exciting the field of said exciter, and a commutator for commutating the alternating impulses from said transformer, substantially as described.

4. The combination, with an alternate-current dynamo-electric generator, of an exciter to said generator and means for exciting the field of said exciter by current from said generator, said means comprising electrical connections for receiving alternating impulses both from the main current and from a parallel current shunted from said main current, and commutators for commutating the said impulses before they are utilized for excitation, substantially as described.

5. The combination, with an alternate-current dynamo-electric generator, of an exciter to said generator, having the initial excitation of its field obtained by impulses from a transformer whose primary circuit is a shunt on the main conductors or terminals, substantially as described.

6. The combination, with an alternate-current dynamo-electric generator, of a transformer having two primary circuits, one connected with the main circuit and the other in a shunt on the main conductors, electrical connections whereby the energy of the impulses generated in the secondary of said transformer is utilized for the excitation of the field of said generator, and a commutator whereby the said impulses are commutated before they are so utilized, substantially as described.

In testimony whereof we have signed our names to this specification in the presence of two subscribing witnesses.

ROBERT PERCY SELLON.
   W. M. MORDEY.

Witnesses:
 CHAS. JAS. JONES,
 HENRY NEWBY,
*Both of 47 Lincoln's Inn Fields, London.*